United States Patent [19]
LaForest

[11] 4,130,861
[45] Dec. 19, 1978

[54] POWER LINE CARRIER NOISE ELIMINATION

[75] Inventor: James J. LaForest, Schenectady, N.Y.

[73] Assignee: General Electric Company, Schenectady, N.Y.

[21] Appl. No.: 752,932

[22] Filed: Dec. 22, 1976

[51] Int. Cl.² .......................................... H02M 1/12
[52] U.S. Cl. ...................................... 363/39; 328/167; 340/310 A
[58] Field of Search ............... 328/162, 167; 340/216, 340/310 R, 310 A; 361/64, 66, 68; 363/39, 47

[56] References Cited

U.S. PATENT DOCUMENTS

| | | | |
|---|---|---|---|
| 3,204,245 | 8/1965 | Dykaar | 340/310 A X |
| 3,287,722 | 11/1966 | Craig | 340/310 A |
| 3,332,000 | 7/1967 | Greening et al. | 361/56 X |
| 3,388,389 | 6/1968 | Henriques | 340/216 |
| 3,924,223 | 12/1975 | Whyte et al. | 340/310 R |

*Primary Examiner*—William M. Shoop
*Attorney, Agent, or Firm*—Harold H. Green, Jr.

[57] ABSTRACT

A method and apparatus are provided for eliminating noise signals from power transmission lines utilized for transmitting information signals in power line carrier systems. Use is made of the principle that signals transmitted line-to-ground are more severely attenuated than signals transmitted line-to-line. Capacitive impedance is selectively added to the system to effect coupling of the noise signals to the transmission lines in a line-to-ground mode.

8 Claims, 2 Drawing Figures

POWER LINE CARRIER NOISE ELIMINATION

BACKGROUND OF THE INVENTION

1. Field of the Invention

This invention relates to power line carrier systems for transmitting information signals on power transmission lines, and more particularly to the elimination of noise signals from the lines.

2. Description of the Prior Art

In recent years much attention has been given to the development of techniques for transmitting information signals down power transmission lines. Power line systems in which such techniques are employed are termed power line carrier (PLC) systems. It has been recognized that attenuation of signals transmitted down the lines is dependent upon the mode of transmission (e.g. line-to-line, line-to-ground), but this knowledge has not been applied to effect removal of noise signals interfering with effective reception of the information signals at locations down the lines. The present invention provides a method and apparatus for utilizing known line attenuation characteristics to minimize the transmission of noise signals in PLC systems.

SUMMARY OF THE INVENTION

Noise signals introduced onto transmission lines of PLC systems are eliminated by a unique application of the principle that signals transmitted line-to-ground are more severely attenuated than signals transmitted line-to-line. In accordance with the invention, information signals to be transmitted on such systems are applied to the transmission lines in a line-to-line mode to minimize attenuation. Additionally, noise signals introduced onto the individual transmission lines are closely coupled to each other so that they are of substantially equal magnitude and in phase, and are thus transmitted down the lines in a line-to-ground mode to maximize attenuation. Close coupling of the noise signals is accomplished by electrically connecting capacitive impedances between wires joining noise sources to the transmission lines.

DESCRIPTION OF THE PREFERRED EMBODIMENT

Figure 1:
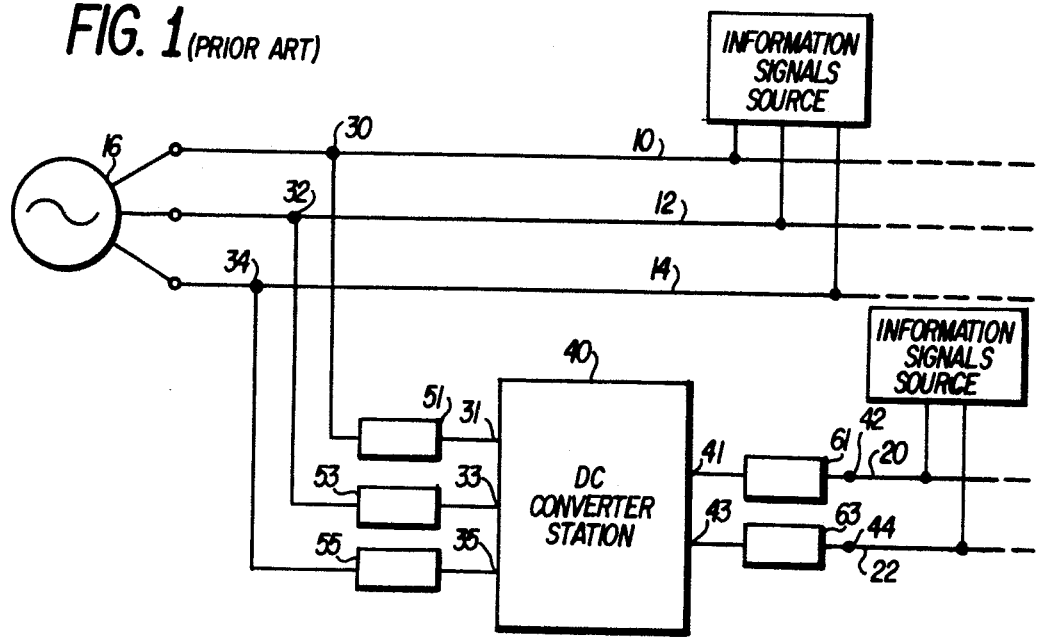
FIG. 1 is a schematic illustration of a portion of a typical prior art power line carrier system.

FIG. 1 illustrates an exemplary prior art PLC system including a three-phase AC transmission system comprising lines 10, 12 and 14 and a DC transmission system comprising lines 20 and 22. In each of these systems the lines are considered to be in horizontal configuration for purposes of calculations to be made below. AC power is produced at generator station 16 and then transmitted down lines 10, 12 and 14 to AC power users. The AC transmission lines are tapped at points 30, 32 and 34 to provide AC power to a DC converter station 40 at input terminals 31, 33 and 35, respectively. Station 40 converts this AC power to DC power provided at output terminals 41 and 43 which are wired to points 42 and 44 for transmission to DC power users by the lines 20 and 22. Both the AC and the DC transmission lines are utilized for the transmission of information signals in this exemplary system. Sources of these information signals connected to the AC transmission lines and to the DC transmission lines have been indicated only generally in the drawing since any conventional source of such signals may be employed.

Commutation in DC converter stations is a source of substantial electrical noise signals which range in frequency from various harmonics of the AC power frequency up to the frequency region typically employed for transmission of information signals in PLC systems (50 to 400 kHZ) and beyond to the AM broadcast band (0.5 to 1.6 MHZ). The region 50 to 400 kHZ is of particular interest because of the possibility of interference with the information signals on the AC and DC transmission lines of the PLC system. Serial impedances having high magnitudes in this frequency region, such as those indicated at 51, 53, 55, 61 and 63, are utilized to block passage of noise signals from the converter station to the AC and the DC transmission lines. These impedances attenuate noise signals produced by the converter station, but they do not totally block passage to the transmission lines.

The noise signals appearing on the individual lines of the AC and the DC transmission systems when measured with respect to ground, can be random or predictable in time depending on the characteristics of the non-attenuated noise signals appearing at the terminals of the converter station. There are three common situations: (a) noise signals on the individual lines are random with no correlation therebetween; (b) noise signals on the individual lines are random, but correlated; and (c) noise signals on the individual lines are predictable in time. For any of these situations, or combinations thereof, propagation of noise signals down the transmission lines may be analyzed by using modal transmission theory. This theory considers different modes of signal transmission down a line. For example, for a three-phase transmission line, such as that of FIG. 1, modes 1, 2 and 3 are considered. Each of these modes represents a particular component of a transmitted signal, with modes 1 and 2 representing line-to-line components and mode 3 representing a line-to-ground component.

Much has been written on modal transmission theory, including descriptions of techniques for making signal attenuation calculations for multiple line power transmission systems of different configurations. For detailed information relating to such calculations reference may be made to numerous publications including the following:

Wave Propagation Along Unbalanced High Voltage Transmission Lines by G. E. Adams, AIEE Transactions, volume 78, pages 639 to 647 (1959).

Radio Frequency Propagation on Polyphase Lines by L. O. Barthold, IEEE, volume 83, pages 665 to 671 (1964).

EHV Transmission Line Reference Book, Edison Electric Institute, pages 109 to 113 (1968).

A typical set of attenuation rates calculated for the three modes of transmission on a three-line, horizontal configuration power transmission system are:

mode 1 = 0.03 db/km
mode 2 = 0.06 db/km
mode 3 = 0.54 db/km

These rates are calculated for signals having a frequency of 100 kHZ and are applicable to the AC transmission line of FIG. 1. The ratio of these rates is 1/2/18 for modes 1/2/3, respectively. The rates of attenuation on transmission lines changes with signal frequency, but their ratio for the three modes relative to each other tends to remain constant over the frequency region of interest in the present invention.

It is evident from the above ratio that mode 3 signals (line-to-ground) are severely attenuated with respect to modes 1 and 2 signals (line-to-line). Over a long line mode 3 signals are essentially eliminated, leaving only mode 1 and mode 2 signals. The present invention takes advantage of these attenuation relationships to provide a simple means for eliminating noise signals introduced onto the lines by such noise sources as DC converter stations. This is accomplished by ensuring that all noise signals placed on PLC transmission lines are primarily mode 3. The information signals are placed on the transmission lines in a line-to-line mode, that is, in mode 1 or mode 2.

To maximize the portion of noise signals transmitted in mode 3 it is required that the noise signals on the individual lines of a transmission system be equal and in phase. These signals may be random with respect to ground, but not with respect to each other. In other words, the magnitude of such noise signals, measured line-to-line, is essentially zero. Accomplishment of this requirement is effected by electrically connecting capacitive impedances between each wire and every other wire joining the noise source to the transmission lines. These impedances should be of high magnitude at power transmission frequencies, but of very low magnitude in the frequency region employed for transmission of information signals so that noise signals occurring in this latter frequency region and placed on the individual lines of the transmission system are closely coupled.

Figure 2:
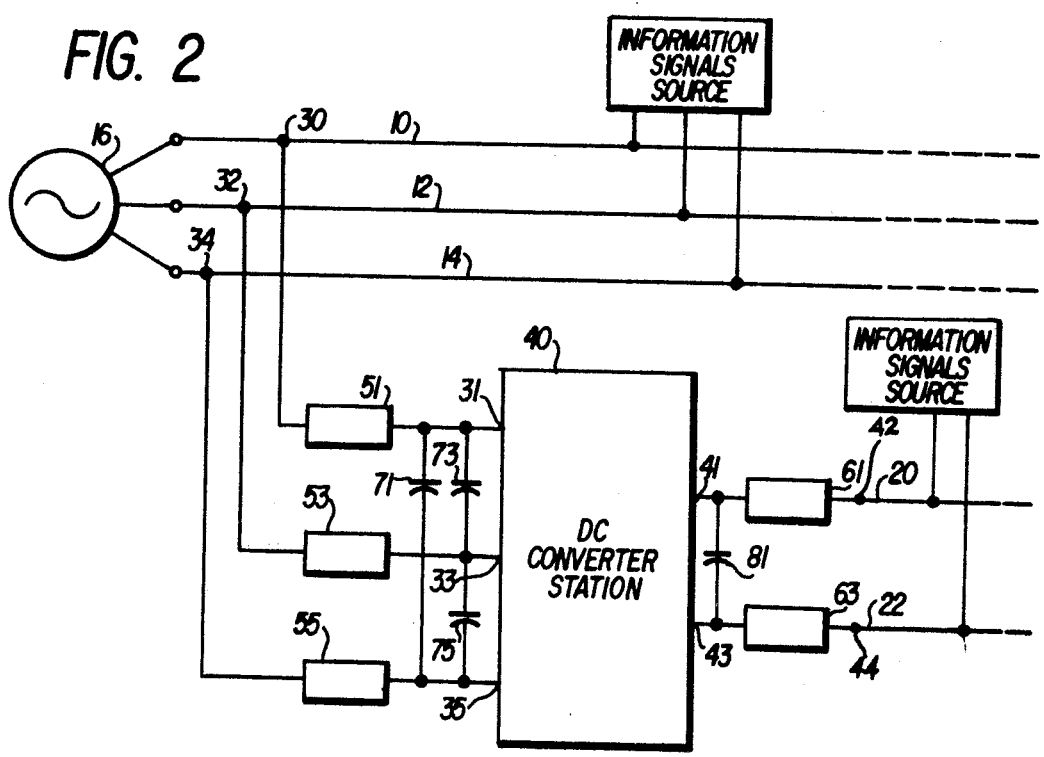
FIG. 2 is a schematic illustration showing the addition of capacitive impedances to the system of FIG. 1 in accordance with the present invention.

FIG. 2 illustrates the exemplary PLC system after incorporation of such impedances. Capacitive impedances 71, 73 and 75 have been electrically connected between the wires joining the DC converter station to the AC transmission lines. Capacitive impedance 81 has been electrically connected between the wires joining the converter station to the DC transmission lines. If serial impedances such as those indicated by 51, 53, 55, 61 and 63 are utilized it is preferable that the capacitive impedances be electrically connected on the converter station side of the serial impedances, since the serial impedances will then act to isolate the capacitive impedances from information signals on the transmission lines. It is not necessary to connect them on this side, however, since isolating impedances are normally placed in the transmission lines at points where information signals are introduced onto the lines.

Some idea of the benefit that will be realized by use of the present invention can be obtained by calculating the effect of noise signals resulting from incorporation of the capacitive impedances. Calculations will again be based on a three-wire horizontal configuration transmission line.

The modal composition of noise signals normally appearing on the wires of a three-wire, three-phase transmission line can be determined by use of the transformation matrix:

$$\begin{bmatrix} V_1 \\ V_2 \\ V_3 \end{bmatrix} = \begin{bmatrix} N_{1A} & N_{1B} & N_{1C} \\ N_{2A} & N_{2B} & N_{2C} \\ N_{3A} & N_{3B} & N_{3C} \end{bmatrix} \cdot \begin{bmatrix} V_A \\ V_B \\ V_C \end{bmatrix}$$

where, $V_1$, $V_2$ and $V_3$ represent the voltage magnitudes of mode 1, mode 2 and mode 3 components of noise signals appearing on the wires; the symbols N represent transformation coefficients; and $V_A$, $V_B$ and $V_C$ represent the voltage magnitudes of noise signals measured to ground at their point of application onto the three lines carrying phase A, phase B and phase C power, respectively.

The noise signals placed on the three lines of the prior art AC system as a result of introducing a one volt noise signal onto the phase A line are:

$V_A = 1.0$ volt
$V_B = 0$
$V_C = 0$ and the magnitudes of the modal noise signal components on phase A are calculated by using typical transformation coefficients for the exemplary horizontal line configuration:

$$\begin{bmatrix} V_{1A} \\ V_{2A} \\ V_{3A} \end{bmatrix} = \begin{bmatrix} +0.4 & -0.8 & +0.4 \\ +0.7 & 0 & -0.7 \\ +0.6 & +0.6 & +0.6 \end{bmatrix} \cdot \begin{bmatrix} 1.0 \\ 0 \\ 0 \end{bmatrix}$$

$V_{1a} = 0.40$ volt
$V_{2A} = 0.70$
$V_{3A} = 0.60$

The above-calculated voltages ($V_{1A}$, $V_{2A}$, $V_{3A}$) are typical magnitudes of mode 1, mode 2 and mode 3 noise signal components introduced onto the phase A line as a result of introducing the one volt noise signal onto phase A. Note that the magnitudes of noise signal components in the low attenuation line-to-line modes 1 and 2 are comparable to the magnitude of the noise signal component in the high attenuation line-to-ground mode 3.

After adding capacitive impedance in accordance with the present invention the noise signals placed on the three lines as a result of introducing a one volt noise signal onto the phase A line becomes:

$V_A = 1.0$ volt
$V_B = 0.7$
$V_C = 0.7$

Note that a substantial portion of the noise signal has been coupled onto the phase B and phase C lines. The magnitudes of the modal noise signal components on phase A are again calculated:

$$\begin{bmatrix} V_{1A} \\ V_{2A} \\ V_{3A} \end{bmatrix} = \begin{bmatrix} +0.4 & -0.8 & +0.4 \\ +0.7 & 0 & -0.7 \\ +0.6 & +0.6 & +0.6 \end{bmatrix} \begin{bmatrix} 1.0 \\ 0.7 \\ 0.7 \end{bmatrix}$$

$V_{1a} = 0.12$ volt
$V_{2a} = 0.21$
$V_{3a} = 1.44$

Adding the capacitive impedances has brought about a significant decrease in the magnitude of mode 1 and mode 2 components of the phase A noise signals and a corresponding increase in the magnitude of the mode 3 component. Specifically, the relative change of modal component magnitudes effected by the adding these impedances are:

$$\text{mode } 1 = \frac{0.12}{0.40} = -10.5 \text{ db}$$

$$\text{mode } 2 = \frac{0.21}{0.70} = -10.5 \text{ db}$$

$$\text{mode } 3 = \frac{1.44}{0.60} = +7.6 \text{ db}$$

In addition to noise signals introduced directly onto phase A by the noise source, a portion of noise signals introduced directly onto phases B and C by the noise source is transferred to phase A by electrostatic and electromagnetic coupling inherently present in PLC systems. Assuming introduction of 1-volt noise signals onto phases B and C, the modal components of the portions of these signals transferred to phase A before and after adding the capacitive impedances may be calculated as above:

| TRANSFERRED FROM PHASE B | | |
|---|---|---|
| before | after | relative change |
| $V_{1A} = -0.80$ volt | $-0.24$ volt | $-10.5$ db |
| $V_{2A} = 0$ | 0 | 0 |
| $V_{3A} = +0.60$ | $+1.44$ | $+7.6$ |

| TRANSFERRED FROM PHASE C | | |
|---|---|---|
| before | after | relative change |
| $V_{1A} = +0.40$ volt | $+0.12$ volt | $-10.5$ db |
| $V_{2A} = -0.70$ | $-0.21$ | $-10.5$ |
| $V_{3A} = +0.60$ | $+1.44$ | $+7.6$ |

The modal components of noise signals on phases B and C are similarly affected by the addition of the capacitive impedances. If desired, the components on phases B and C can be calculated by utilizing the transformation coefficients given above.

In terms of attenuation the connection of capacitive impedances at noise signal sources, in accordance with the present invention, effects a dramatic noise signal reduction over a relatively short length of a transmission line. For example, consider the attenuation of a 1-volt noise signal introduced onto phase A. The modal components of this noise signal as calculated before and after adding the capacitive impedances are:

| before | after |
|---|---|
| $V_{1A} = 0.40$ volt | $0.12$ volt |
| $V_{2A} = 0.70$ | $0.21$ |
| $V_{3A} = 0.60$ | $1.44$ |

Utilizing the 0.03, 0.06 and 0.54 db/km attenuation coefficients for the mode 1, 2 and 3 components, decay of the noise signal can be calculated. After propagation down 50 Km of transmission line, for example, the modal components before and after adding the capacitive impedances have decayed to:

| before | after | relative change |
|---|---|---|
| $V_{1A} = 0.34$ volt | $0.10$ volt | $-10.6$ db |
| $V_{2A} = 0.50$ | $0.15$ | $-10.6$ |
| $V_{3A} = 0.03$ | $0.06$ | — | and the overall magnitude of the noise signal 50 km down the line is:

| before | after | relative change |
|---|---|---|
| $V_A = 0.53$ volt | $0.18$ volt | $-9.2$ db |

Modern PLC systems generally utilize a form of line-to-line transmission embodying a combination of both mode 1 and mode 2 characteristics. The above comparison shows a substantial reduction in noise signals transmitted in these modes by essentially transferring noise signals normally existing in these modes into mode 3 noise signals which are highly attenuated during transmission. The small amount of mode 3 noise remaining after transmission is of little concern, since PLC receivers are designed to reject mode 3 signals, preferentially.

Although noise signal elimination from PLC communication systems has been described with reference to a specific application for eliminating noise signals produced by DC converter stations, the invention is not limited to such use. Rather, the invention may be effectively employed to eliminate noise signals placed on PLC transmission lines by any source connected thereto. Also, it is to be understood that although the above calculations are based on a three-phase, horizontal line configuration AC system, the invention is not limited to use with AC systems having this configuration. Rather, it is equally effective when used with other line configurations and with DC systems. Accordingly, while a preferred embodiment of the method and apparatus of the present invention has been described, the scope of the present invention is intended to be limited only by the appended claims.

I claim:

1. In a power line carrier system for transmitting information signals on power transmission lines and including wires joining a noise source to the lines, a method for eliminating noise signals placed on the lines by the source, said method comprising the steps of:
   (a) applying the information signals to the lines in a line-to-line mode to minimize attenuation thereof during transmission; and
   (b) introducing capacitive impedance between each wire and every other wire to closely couple the noise signals placed on the individual lines so that they are of substantially equal magnitude and in phase and are placed on the lines in a line-to-ground mode to maximize attenuation thereof during transmission.

2. In a power line carrier system for transmitting information signals on power transmission lines and including wires joining a noise source to the lines, means for eliminating noise signals placed on the lines by the source, said means comprising:
   (a) means for applying the information signals to the lines in a line-to-line mode to minimize attenuation thereof during transmission; and
   (b) a separate capacitive impedance electrically connected between each wire and every other wire to closely couple the noise signals placed on the individual lines so that they are of substantially equal magnitude and in phase, and are placed on the lines in a line-to-ground mode to maximize attenuation thereof during transmission.

3. A power line carrier system for transmitting information signals on power transmission lines and eliminating noise signals placed on the lines by apparatus connected thereto, said system including:
   (a) AC power transmission lines carrying AC power;
   (b) means for applying the information signals to the lines in a line-to-line mode to minimize attenuation thereof during transmission;
   (c) a DC converter for producing DC power from AC power, said converter originating incidental noise signals;
   (d) a separate wire joining each of the AC lines to an input terminal of the converter; and
   (e) a separate capacitive impedance electrically connected between each wire and every other wire to closely couple noise signals placed on the individual lines by the converter so that they are of substantially equal magnitude and in phase, and are placed on the lines in a line-to-ground mode to maximize attenuation thereof during transmission.

4. A power line carrier system as in claim 3, and further including a serial impedance electrically connected in each of the wires to attenuate the noise signals placed on the lines.

5. A power line carrier system as in claim 4, where the capacitive impedances are electrically connected on the converter side of the serial impedances.

6. A power line carrier system as in claim 3, and further including:
   (a) a pair of DC power transmission lines carrying DC power;
   (b) means for applying information signals to the DC lines in a line-to-line mode to minimize attenuation thereof during transmission;
   (c) a pair of wires connecting the DC lines to output terminals of the converter; and
   (d) a capacitive impedance electrically connected between said pair of wires to closely couple noise signals placed on the individual DC lines by the converter so that they are of substantially equal magnitude and in phase, and are placed on the lines in a line-to-ground mode to maximize attenuation thereof during transmission.

7. A power line carrier system as in claim 6, and further including a serial impedance electrically connected in each of the wires to said pair to attenuate the noise signals placed on the DC lines.

8. A power line carrier system as in claim 7, where the capacitive impedance is electrically connected on the converter side of the serial impedances.